United States Patent [19]

Carvey et al.

[11] Patent Number: 5,041,971
[45] Date of Patent: Aug. 20, 1991

[54] MEMORY ACCESSING SWITCH NETWORK

[75] Inventors: Philip P. Carvey, Bedford; William R. Crowther, Lexington; Randall D. Rettberg, Concord, all of Mass.

[73] Assignee: Bolt Beranek and Newman Inc., Cambridge, Mass.

[21] Appl. No.: 277,993

[22] Filed: Nov. 30, 1988

[51] Int. Cl.[5] .................... G06F 13/00; G06F 15/16
[52] U.S. Cl. ................... 364/200; 364/238.2; 370/94.1; 370/60
[58] Field of Search ... 364/200 MS File, 900 MS File

[56] References Cited

U.S. PATENT DOCUMENTS

| | | | |
|---|---|---|---|
| 4,598,400 | 7/1986 | Hillis | 370/60 |
| 4,789,927 | 12/1988 | Hannah | 364/200 |
| 4,805,091 | 2/1989 | Thiel et al. | 364/200 |
| 4,814,980 | 3/1989 | Peterson et al. | 364/200 |
| 4,831,519 | 5/1989 | Morton | 364/200 |

OTHER PUBLICATIONS

Kraley et al, "A New Multiprocessor Architecture," Bolt Beraner & Newman, Inc., Report No. 3501, Dec. '78.

Primary Examiner—Gareth D. Shaw
Assistant Examiner—Maria Napiorkowski
Attorney, Agent, or Firm—Henry D. Pahl, Jr.

[57] ABSTRACT

In parallel processing computational apparatus, a switching network employing both routing switch elements and concentrator elements efficiently couples bit serial messages from a multiplicity of processors to a multiplicity of memory modules. The apparatus operates in a highly synchronous mode in which all processors issue memory requests only at essentially the same predetermined time within a frame interval encompassing a predetermined substantial number of clock periods. The routing switch elements and concentrator elements incorporate circuitry for comparing the addresses of requests which may be blocked at any element with requests which get through and, if the addresses are the same, returning the memory response to all processors seeking the same memory location.

14 Claims, 10 Drawing Sheets

MEMORY ACCESSING SWITCH NETWORK

BACKGROUND OF THE INVENTION

The present invention relates to computers and more particularly to computers providing parallel processing capability through the use of multiple processors which share a single large memory. As is understood by those skilled in the art, certain mathematical problems exhibit a high degree of parallelism, particularly those which involve the manipulation of large arrays or matrices. Such problems can be broken down into computational segments each of which can be performed by a separate processor.

As is also understood, it is becoming increasingly difficult to significantly improve the power or performance of single processor computers. The increase in cost associated with increases in speed are often disproportionate and real physical limits are being strained in terms of the physical size of the apparatus in relation to the speed of propagation of electrical signals. Accordingly, various proposals and developments have been undertaken to implement multiple processor or parallel processing computers in which the total power of the machine is increased by multiplying the number of processors rather than by increasing the power of any single processor. Some of the approaches proposed have utilized a common bus structure through which all processors communicate with a shared memory. Other approaches utilize a shared memory which the various processors communicate with through a switching network. Examples of this latter type of computer include the Butterfly computer manufactured and sold by Bolt Beranek and Newman Inc. of Cambridge, Mass. and the Connection Machine manufactured and sold by Thinking Machines, Inc. of Cambridge, Mass. The architectures of the Butterfly computer and its switching network are described in BBN Report Nos. 3501 and 4098 (Chapter III) to the Defense Advanced Research Projects Agency (DARPA). The Connection Machine architecture is described in U.S. Pat. No. 4,598,400 issued July 1, 1986 to W. Daniel Hillis.

The present invention relates in large part to an improved parallel processing architecture in which a multiplicity of processors are synchronized to issue memory requests only at the same predetermined time within a computational cycle or frame interval, the requests being issued as bit serial messages. The initial data in the bit serial messages define memory addresses and a novel switch network architecture is provided for efficiently communicating requests from any processor to any memory location even though the number of processors and the number of memory locations may be very large.

As is understood, the number of inter-element leads and switch elements can grow disproportionately to the number of processors employed until the cost of the switching network exceeds that of the processors or memory. The nature of this problem is explored in some length in the BBN Report identified previously.

A further difficult consideration which must be addressed in the design of such switching networks is the incidence of contention between requests. With a large number of processors, it is prohibitive to provide a dedicated path from each processor to each memory location. On the other hand, if there is any sharing of paths, there is some statistical chance of contention, i.e. two memory requests trying to utilize the same path segment. The design of the network must allow for resolution of the contention and also assure that all requests are honored within a reasonable period of time. The architecture of the present invention meets these requirements cost effectively even for systems employing very large numbers of processors and a large, completely shared memory. In addition, the architecture and implementation of the present invention ameliorates the effects of such contention as may occur by allowing memory read requests from multiple processors to be effectively combined when those processors are attempting to read the same memory location.

SUMMARY OF THE INVENTION

Briefly, parallel processing computational apparatus according to the present invention employs a multiplicity of wide word processors. The processors are synchronized to a common clock. The clock provides not only a basic high speed clock period but also defines a start time which enables the various elements of the system to time intervals and operating sequences in synchronism. In particular, the various elements employ a frame interval encompassing a predetermined large number of clock periods. The processors are synchronized so as to issue memory requests only at the same predetermined time within a frame interval. The requests are issued as bit serial messages in which the initial data is the address of the memory location to which the request is directed. The network which selectively connects each processor to each memory location includes a plurality of similar routing switch elements arranged in at least three stages, each routing element having plurality of output leads connectable to respective different address groups of said memory locations and a plurality of input leads, any one of which may receive a message seeking direction to any one of the address groups. The routing elements in each stage address selected routing elements in the next stage in response to corresponding address bits in the request messages. Interposed between at least two stages of the routing elements are a stage of concentrator elements. Each concentrator element has a plurality of input leads connected to address-equivalent output leads of the preceding level of routing elements and a plurality of output leads connected to the address-equivalent leads of the following stage of routing elements, the number of concentrator element output leads being substantially smaller than the number of concentrator element input leads. The concentrator elements include means for transferring a message arriving at any input lead to an output lead based on a random selection of simultaneously incoming messages, up to the number of output leads.

In accordance with another important aspect of the present invention, both the routing elements and the concentrator elements are implemented as matrix crossbar switches providing bidirectional data path means for connecting an input lead to an output lead and a connection is allocated for essentially an entire frame interval so that memory responses can be communicated back to a requesting processor without further routing decisions and allocations. Further, the routing elements and the concentrator elements include, associated with each matrix intersection, comparator means for determining whether any unallocated message blocked at that intersection is addressed to the same location as an allocated message and, if the addresses are determined to be the same, communicating the memory response to the allocated request also back to the processor issuing the unallocated message.

BRIEF DESCRIPTION OF THE DRAWINGS

Corresponding reference characters indicate corresponding parts throughout the several views of the drawings.

DESCRIPTION OF THE PREFERRED EMBODIMENT

As indicated previously, an advantage of the architecture of the present invention is that it enables the effective utilization of a very large number of processors sharing a very large memory, each processor being given equal access to all parts of the memory. The particular architecture specifically illustrated herein allows for over 30,000 processors addressing 16 gigabytes of memory. Another advantage of the present architecture is that it is highly regular and is implemented using large numbers of each of a relatively small number of different modules or logical elements. In particular, essentially the same routing switch element is used repeatedly throughout the switching network as is a concentrator switch element which is interposed betwen various stages of switching elements. Further, the routing switch elements and the concentrator elements share many digital logic subgroups which are repeated in a regular fashion in each of these elements.

Figure 1:
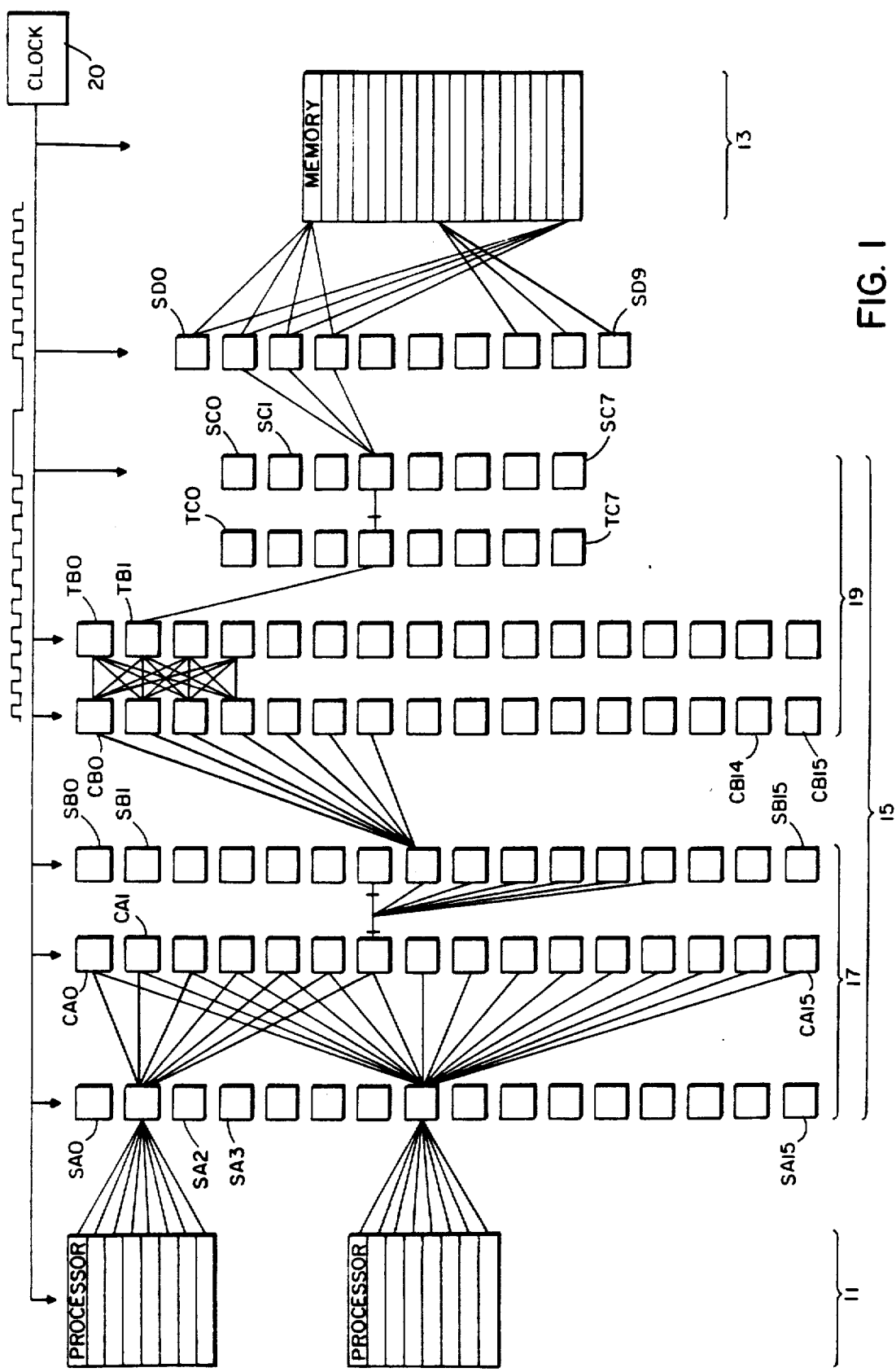
FIG. 1 is a block diagram illustrating the overall organization of the major components of a multiprocessor computer constructed in accordance with the present invention.

The regular nature of the architecture is illustrated in FIG. 1. In view of the very large number of identical components in the overall system, only representative groupings of each type are shown. Similarly, only illustrative sets of connections between the various elements are shown so as not to obscure the drawings. In FIG. 1, the processors generally are designated by reference character 11, the memory modules by reference character 13, and the interconnection network by reference character 15. Certain of the processors may be dedicated to IO (input/output) operation and may be provided with connections to terminals, workstations and disk memory.

Each processor communicates with the switching network 15 by means of a single lead through which the processor transmits and receives bit serial messages. The memory itself is organized into a succession of modules, each module holding 65536 words of data. As is explained in greater detail hereinafter, however, the data words in a given memory module are not logically consecutive but, rather, the memory is highly interleaved, i.e. on a word basis. Each memory module is multiply ported and comprises eight bidirectional leads for receiving bit serial request messages and for issuing bit serial responses thereto.

As indicated previously, the communications network which couples processors to memory employs a plurality of similar routing switch elements arranged in successive stages or levels. In the embodiment illustrated, four such stages are provided and in FIG. 1 the routing switch elements in the first stage, i.e. the stage closest to the processors, are designated by reference character SA0-SA15. Similarly, those in the second stage are designated by reference characters SB0-SB15; those in the third stage by reference characters SC0-SC7; and those in the fourth stage by reference characters SD0-SD9. A set of concentrator elements, designated by reference characters CA0-CA15 are interposed between the first and second stages of routing switch elements and a second set of concentrator elements, designated by reference characters CB0-CB15 are interposed between the second and third stages of routing switch elements. In the particular switching network arrangement illustrated herein, the first, second and fourth stages of routing switch elements implement the full 16-way routing while in the third stage only 8-way routing is implemented.

In terms of physical proximity, as opposed to any corresponding logical distinction, part of the communications network, designated by reference character 17, may be thought of as being associated with or physically proximate to the processors while another portion, designated by reference character 19, may be thought of as physically proximate to the memory. Output signals from the concentrators CB0-CB15 are communicated to the input leads of the next stage routing switch elements SC0-SC7 through leads provided with transceivers TB0-TB15 and TC0-TC7 at the ends of the leads. These leads may, for example, be implemented as coax or twinax cable and, with the transceivers, are appropriate for spanning larger physical distances, i.e. the distances between separate card cages as opposed to signals linked on the same circuit card or between cards in the same cage. Again it should be understood that only representative ones of the various components are shown in FIG. 1 and that the numbers of the components will in fact be greatly multiplied as will their myriad cross-connections.

As indicated previously, the multiprocessor system of the present invention is highly synchronized. In particular, the processors issue memory requests essentially simultaneously at a predetermined time within a first part of a frame interval and the request messages proceed in synchronized fashion across the switch network. Timing is provided by a master clock circuit, designated by reference character 20 in FIG. 1, which provides timing signals to all of the subcomponents of the system. In particular, the clock defines not only the basic high speed clock period but also periodically indicates a start or resynchronization time which enables the elements of the overall system to sequence and operate in synchronism. In particular, the system utilizes a frame interval which encompasses a large number of clock periods, e.g. 360 clock periods in the embodiment described herein. While separate leads could be provided, the start indication is preferably encoded into the basic clock signal, e.g. by periodically providing relatively long high and low states or by periodically reversing the phase of a pair of adjacent bits, so that the start information can be extrated from the same signal as the basic clock. In this way phasing errors can be avoided. While the various elements of the system utilize the start of timing information to define synchronized frames as described in greater detail hereinafter, the start of timing information does not need to be generated every frame interval and preferably is not.

An advantage of the switch network architecture and addressing scheme of the present invention is that the memory is highly interleaved, i.e. on a word basis. The routing switch elements employed in the embodiment illustrated have 12 input leads and provide for 16-way switching, that is, a message applied to any one of the input leads can be routed, depending upon the address information contained in the message, to any one of 16 memory address regions. Further, the routing elements provide two output leads for each address region so that more than one message can be routed to the same address region during a given frame interval. The routing elements thus comprise 32 output leads. While the routing switch elements as described herein provide for up to twelve inputs, contention in the interior of the switch network is marked reduced if not all inputs in the first stage are connected to processors. In the particular overall architecture cescribed herein only eight general purpose processors are connected to each routing switch element.

Figure 2:
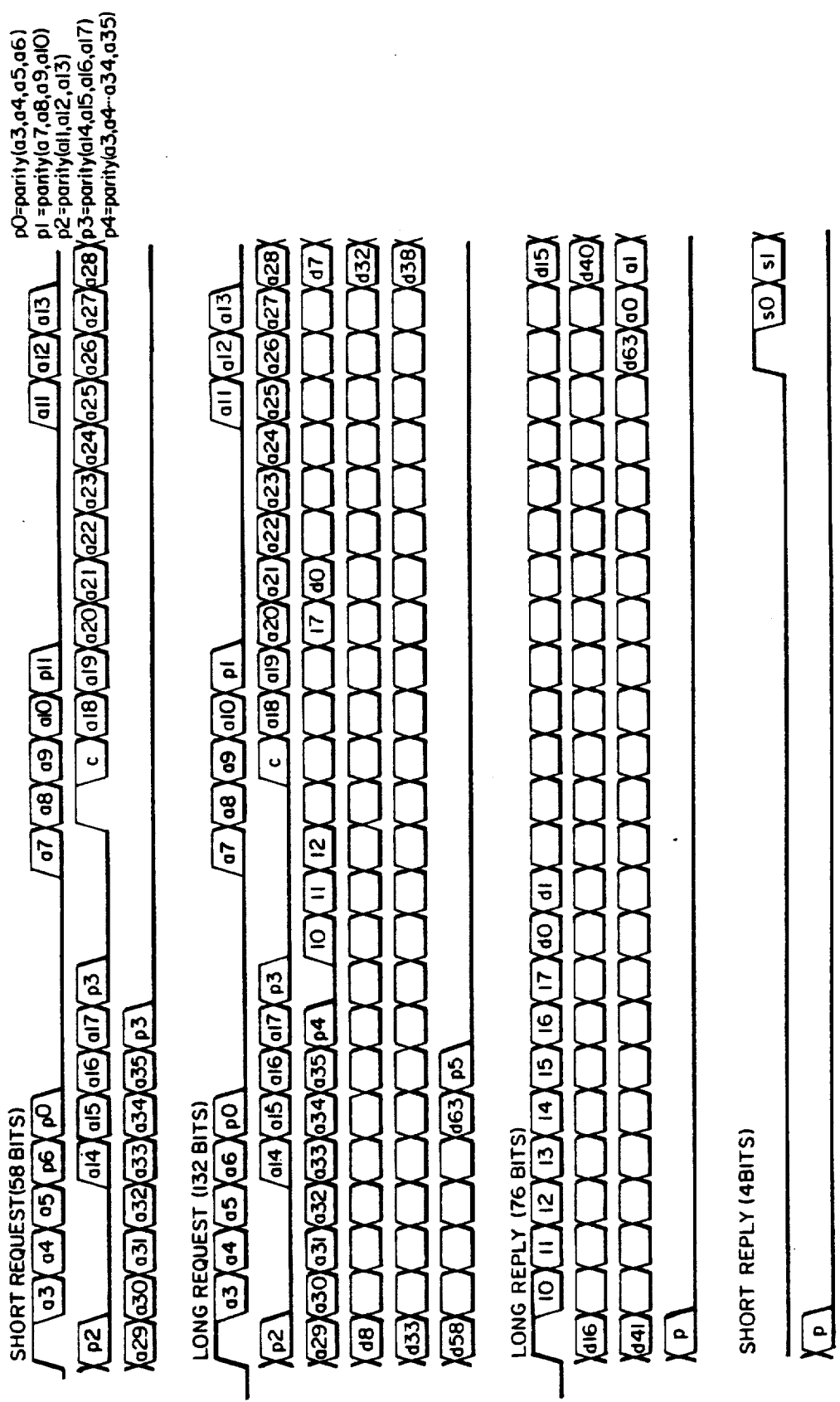
FIG. 2 is a diagram illustrating the format of bit serial messages passed between the processors and memory modules in the computer system of FIG. 1.

The particular manner in which the routing is implemented is described in greater detail hereinafter but the general functionality is described at this point to facilitate an understanding of the overall architecture of the system. The particular processors employed in connection with the network illustrated herein, employ a large word data format, i.e. a word which is 64 bits wide, together with a tag of eight bits. The tag carries information regarding the data type and identification of certain types of operation, e.g. the so-called "stealing" of memory locations. Typical various message formats are illustrated in FIG. 2.

As noted previously, the processors communicate with the memory by means of bit serial messages in which the first part of the message data comprises the memory address. An initial start bit is provided so that the start of a message may be readily detected in conventional manner. Further, it should be noted at this point with reference to FIG. 2 that the memory address is presented with the least significant bits first and that the lower order address bits are arranged in four groups with each group comprising three or four address bits and a parity bit. In the particular addressing scheme employed, the least significant bit is designated A3. Each address group controls the routing decision at one stage in the passage of the message through the switching network 15. Further, as each routing switch element decodes and acts upon the information contained in the respective address group, that address group is stripped or omitted from the message which is passed on through to the next stage of the network. Further, as illustrated in FIG. 2, the message format includes a gap, i.e. a series of nulls or blank pad bits between each of the address groups. These gaps provide time for the successive routing switch elements to make the respective routing decisions before the rest of the message is passed through the routing switch element to the next stage.

The messages which are passed through the network are, in general, of two types. When data is being passed from the processor to the memory, e.g. as in a STORE instruction, a long request message, e.g. 132 bits, is generated by the processor and the memory sends back a short reply, e.g. four bits. On the other hand, when the processor is seeking data from the memory, e.g. as in a READ operation, it sends a short request, e.g. 58 bits, and the memory responds with a long reply, e.g. 76 bits.

Figure 3:
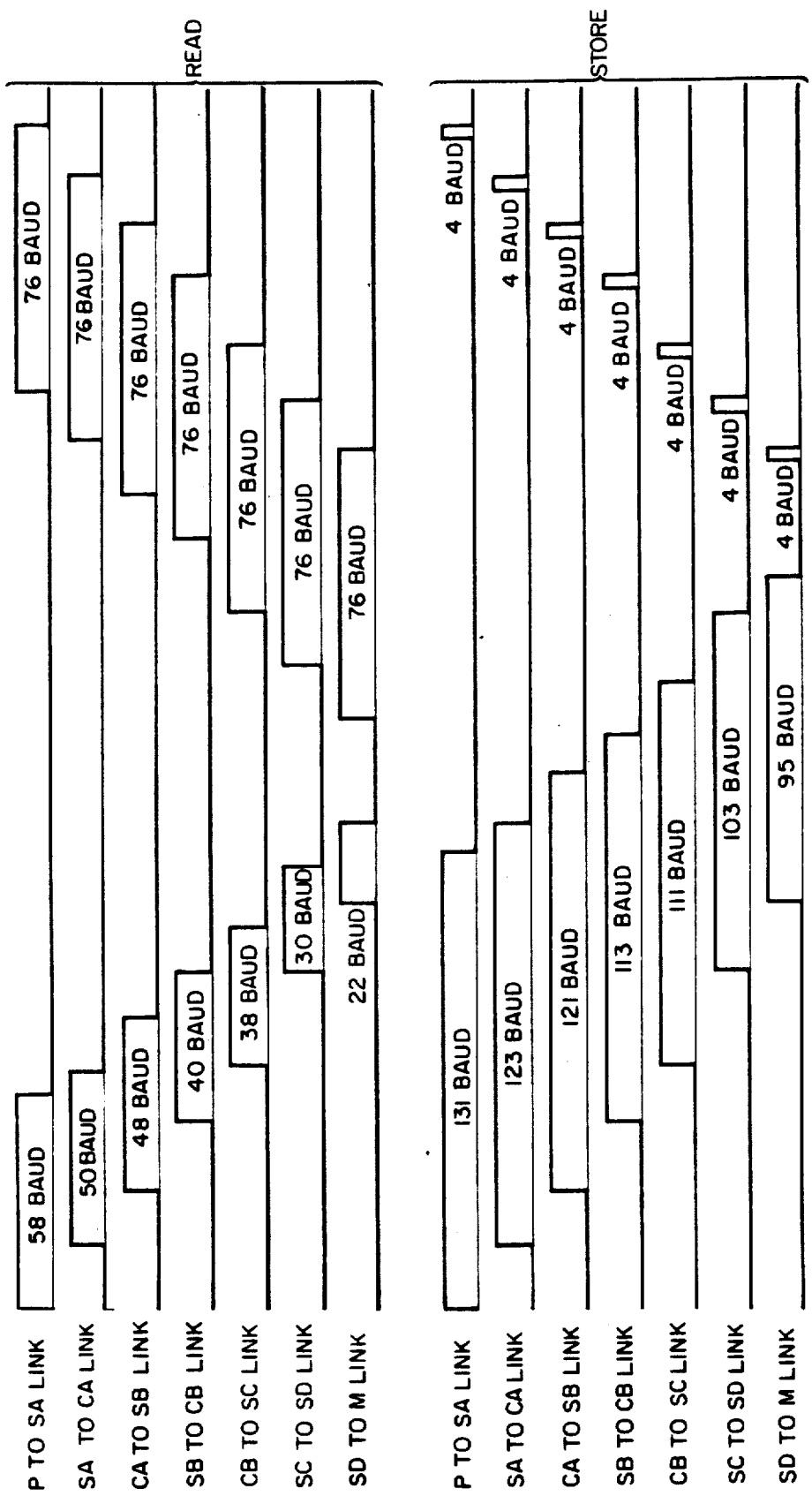
FIG. 3 is a diagram illustrating the relative timing of bit serial messages passing through the switching network of the apparatus of FIG. 1.

FIG. 3 illustrates the relative timing of the two types of message transactions as well as the messages passed through the switching network. As indicated previously, each routing switch element strips off those address bits which were utilized in making its routing decisions before passing the message on to the next stage, e.g. by merely not activating the selected output channel until the unwanted bits are past. Similarly, the concentrator elements strip off leading padding bits that are incorporated in the message format to allow time for the allocation functions performed by the concentrator elements. Further, as may be seen in FIG. 3, the routing switch elements do not store and forward the messages but, rather, introduce only a slight delay and start passing the ongoing portion of the message on to the next stage before the incoming message is complete.

As indicated, the routing switch elements effect 16-way routing in each of the stages except for the third which effects 8-way routing and for each route out of a given routing switch element, at least two paths are provided. If each succeeding stage of routing switch elements had to provide enough input leads to match up with all of the output leads of the preceding stage, the number of switching elements and leads would grow geometrically making a realizable implementation of the network impossible as a practical matter. In accordance with one aspect of the present invention, a stage of concentrator elements is interposed between successive routing switch stages. In the particular embodiment illustrated, a stage of concentrator elements is provided between the first and second stages of routing switching and also between the second and third stages of routing switching.

Unlike the routing switch elements, the concentrator elements perform no address decoding or routing decisions but merely allocate a limited number of address equivalent output leads to a larger number of address equivalent input leads, the allocation being essentially on a random basis. In other words, a given concentrator element will take in as inputs the outputs which are directed to the same region of memory from a plurality of routing switch elements in the preceding stage.

As will be understood, not all of those output leads from the preceding routing stage will in fact be carrying messages during any given frame interval even if all inputs to the preceding stage were addressed, since the number of output leads from a routing switch element is substantially larger than the number of input leads. Therefore, on a statistical basis, the concentrator elements can allocate a much smaller number of input leads to the next stage of routing switch elements with only a relatively small probability of blocking any request. Accordingly, it can be seen that, while each stage of routing switch elements tends to expand the number of leads or connections required, the intervening concentrator stages tend to operate to reduce the number of leads or connections required.

The particular concentrator elements employed in the embodiment illustrated allocate 12 output leads to messages appearing on any one of 32 input leads. By this mechanism, the number of leads is kept within manageable bounds, even for a system comprising a very large number of processors addressing a very large common or shared memory. While the routing switch elements and concentrator elements perform functions which are, in one sense, complementary or opposite in terms of ratio of input leads to output leads, many of the logical components within these elements are in fact quite similar since both types of element perform a matrix switching function of connecting any input lead to any available output lead, i.e. an allocation function. These similarities will become more apparent in the following detailed description of these elements.

An advantage of this switch network architecture and addressing scheme of the present invention is that the memory is highly interleaved, i.e. on a word basis. As described previously with reference to FIGS. 2 and 3, the address is presented and decoded least significant bits first by the switching network, i.e. the first stage of routing switch elements codes and strips off the least significant bits of the address. Similarly, the next stage of routing switch elements operates upon and strips off the next most significant group of address bits and so on. The more significant address bits, i.e. A18-A36, are decoded by the memory module to which the message is finally delivered. In other words, in a given memory module, the lower 15 bits of address are all the same. It will thus be understood that logically adjacent memory addresses will be in fact in different memory modules rather than in the same memory module. An advantage of this interleaving is that data in an array normally stored in successive memory addresses will be, in physical reality, spread over as many memory modules as possible. Accordingly, multiple processors can work on the same array without significant contention for memory access even though the different processors may be working on logically adjacent elements in the array.

Figure 4:
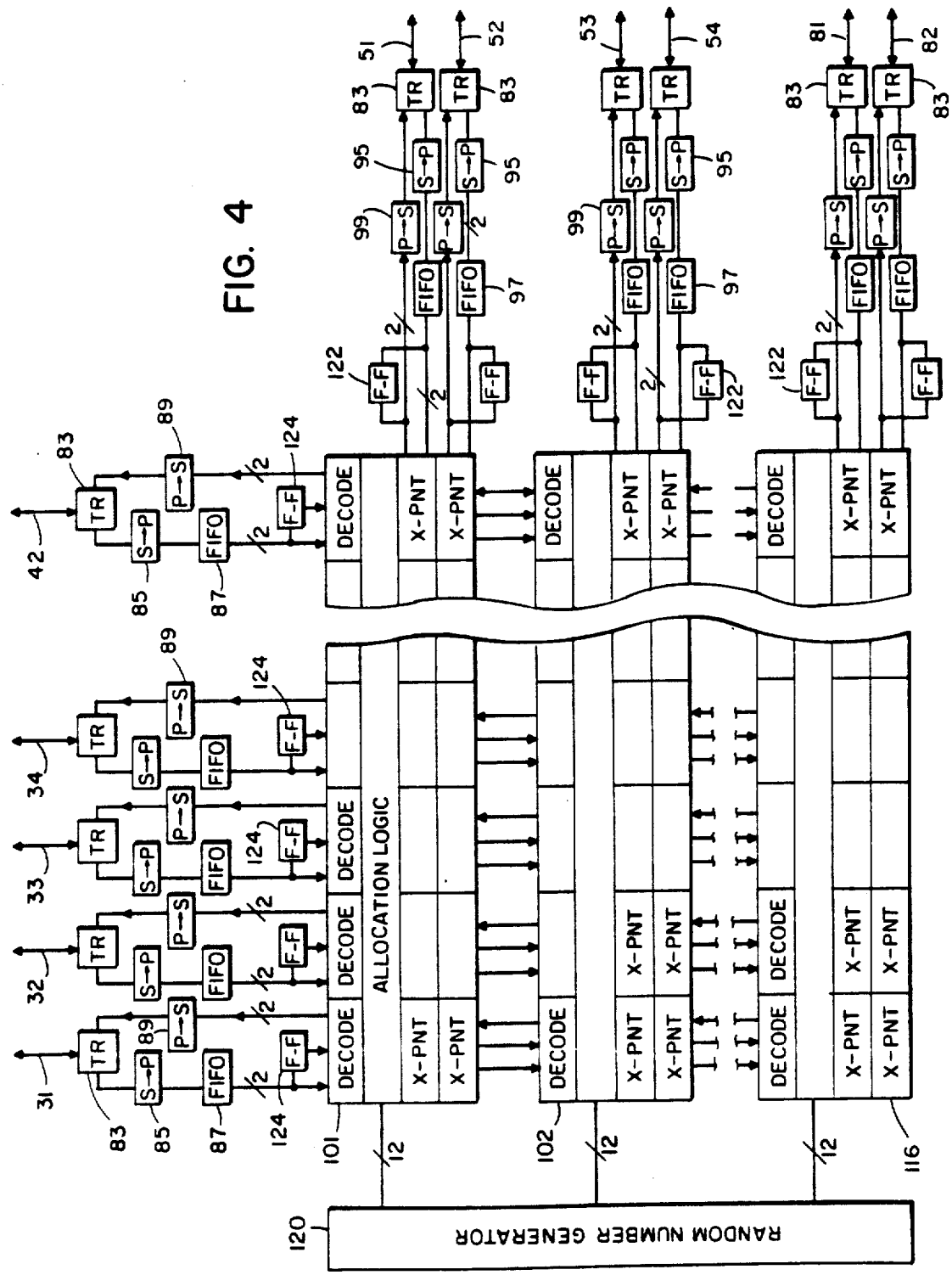
FIG. 4 is a block diagram of a typical routing switch element employed repeatedly in the multiprocessor computer of FIG. 1.

As described previously, the computer system of FIG. 1 employs a large number of routing switch elements which are essentially identical. FIG. 4 illustrates the functional arrangement of a typical one of the routing switch elements. As also described previously, the general function of each routing switch element is to respond to a bit serial message appearing on any one of a plurality of input leads and to couple that message to a selected output lead in accordance with address information incorporated in the message. While, as noted previously, data can flow in both directions through the routing switch element, the term input is used to designate the side or direction from which the originating message arrives. This may also be considered to be the processor side. Thus the output side may similarly be considered to be the memory side.

In its most typical configuration, each routing switch element comprises 12 input leads and 32 output leads, 2 output leads going to each of the 16 regions of memory addressed by the routing switch. In FIG. 4, the input leads are designated by reference characters 31-42 though only five of these are actually shown in the drawing for the purposes of clarity. Similarly, the output leads are designated by reference characters 51-82 though, again, only six of these (three pairs) are actually shown. Preferably, the routing switch elements and the concentrator elements are each implemented as very large scale integrated circuits. In such an implementation, the bit serial communications architecture of the present invention is advantageous in that it minimizes input and output leads.

To maximize the data transfer rates, the data rate on the input and output leads is set just as high as is feasible with the particular type of integrated circuit fabrication technique being employed. However, within the switch element itself, it is advantageous to parallelize the data to a slight degree so that not all of the internal circuitry of the switch element is running at maximum rate. Likewise, in the particular embodiment illustrated, unidirectional data paths are employed within the switch element itself. TR (transmit/receive) switching logic is provided as indicated by reference character 83 at each of the input and output leads for switching the bidirection external lead between two oppositely oriented, unidirectional internal data paths. The transmit, receive logic circuits are operated in response to the clock signals described previously to switch between receive and transmit consistent with the message formats described in relation to FIGS. 2 and 3. As is conventional, sequencing circuitry controlled by the clock 20 is incorporated for providing appropriate timing signals to the various subcomponents of the routing switch element.

During the reception of a processor originated request message received on one of the input or processor side leads 31-42, the received data coming out of the T/R circuitry 83 is sent first to a serial-to-parallel converter 85 which converts the incoming data from a bit serial format to a two-bit wide data path. After conversion, the data is applied to a FIFO (first in, first out) buffer 87. As indicated previously, the processors 11 are operated in synchronism so that all of them issue memory requests at essentially the same time within a frame interval. However, due to differences in lead length and in various gate propagation delays, not all of the messages may arrive on the input leads of the routing switch elements in a given column at exactly the same time but, rather, may be skewed by intervals of up to several high speed clock periods. The FIFO registers 87 provide for re-synchronization of all incoming messages for application to the switching matrix which comprises the interior of each routing switch element. At high data rates, it may also be desirable to provide automatic phase adjustment of the sampling of incoming data signals, e.g. as described in coassigned U.S. Pat. No. 4,700,347.

As illustrated, the switching matrix comprises sixteen similar sub-units, designated by reference characters 101-116. As indicated previously, once a request message has established a route through the switching matrix 15, that route is left set up to allow the memory to send response data back toward the processors through the same path. This response data comes out of the crossbar switch matrix on the input or processor side in two-bit wide format and is converted back to serial data by a parallel-to-serial converter 89 before proceeding on to the T/R switching logic 83.

On the output or memory side essentially similar conversions buffering takes place. In particular, two-bit wide data being passed out of the crossbar switch matrix during the transmission of a processor originated request is converted to bit serial form by a parallel-to-serial converter 99 before being passed out through the T/R circuitry 83 toward the memory. Likewise, bit serial data being received from the memory during the response portion of frame interval is converted to two-bit wide data path by a serial-to-parallel converter 95, this data received from the various memory side leads being re-synchronized by FIFO registers 97.

As indicated previously, the typical routing switch element performs 16-way switching, i.e. a message on any one of the input leads can be directed to any one of 16 regions of memory. Further, multiple output leads, typically two, are provided for each memory region so that a total of 32 output or memory side bit serial data leads are typically provided. At this point it should again be understood that each group of address locations or "region" addressed by a routing switch element does not comprise contiguous or consecutive memory address since the memory is highly interleaved and address information in the messages is decoded least significant bits first.

As indicated previously, the crossbar switch matrix comprises sixteen sub-units 101-116, one for each address region, and all of the data signals from the processor side circuitry are provided to all of the sub-units. In each sub-unit, a pair of cross point circuits, described in greater detail hereinafter, are provided for selectively coupling each set of processor side data channels to either one of the address equivalent output or memory side data channels. In addition, each sub-unit encompasses respective decoding circuitry for decoding the respective address bits of incoming processor-originated messages for each of the input channels. Each sub-unit also comprises allocation logic circuitry which is responsive to all of the decoded address bits as well as to control signals provided by a random number generator 120.

It should be understood that any processor request message appearing at any one of the processor side input leads 31-42 may be seeking to be directed to any one of the memory regions over which the routing switch element has routing control. Since two output channels are provided for each memory region in the particular embodiment illustrated in FIG. 4, up to two processors can address the same region of memory through a given routing switch element at the same time. However, if more than two processor-originated messages are seeking to go to the same memory region, some will have to be blocked in that only two can be directly successful. It should be understood that other embodiments might provide three or more address equivalent output channels for an even greater reduction in blocking likelihood. The general function of the allocation logic is to allocate the available memory side leads to possibly contending request messages on the processor side leads on an essentially random basis so that no processor is given preference to any path through the overall switch matrix 15.

While only two incoming messages may be routed to the same memory region in the first instance, the architecture of the present invention facilitates a procedure, referred to herein as read combining, which greatly reduces the effects of contention when a substantial number of processors are all attempting to read the same memory location. As is understood by those skilled in the art, such a situation can arise under various circumstances when a particular memory location is used to store a flag which is employed to synchronize or interlock multiple processors which are running parallel processes simultaneously.

In general terms, the present invention implements read combining by causing the successive address bits in any input message to be compared with the corresponding address bits in a message which was allocated an output lead. This comparison is made for all address bits and not just for the address bits which control the operation of the particular routing switch element. If no mismatch is found, i.e. if the messages were being directed to the same memory location, the return path cross point switches for the blocked request are actuated so that the memory response message elicited by the successful request is returned not only to the requesting processor side lead but also to the processor side lead which was not allocated an output channel, i.e. which was blocked. Largely as a result of the basically serial format of the data transmission and the synchronized issuing of processor request messages, the comparison circuitry is relatively simple and is included or replicated at each cross point as is described in greater detail hereinafter.

In order to make the address data in the successful message available to the blocked request, the data on the outgoing memory side data path is coupled to the data path or return data. This coupling is provided, with one clock period delay, by flip-flop circuitry designated by reference character 122 on each memory side or output channel. This cross coupling is implemented only during the request portion of the overall frame interval so that there is no interference with the later communication of data being returned by the memory itself. A correspondingly delayed version of the blocked incoming message is applied to a separate set of data leads for each input channel by respective flip-flop circuits 124.

Figure 5:
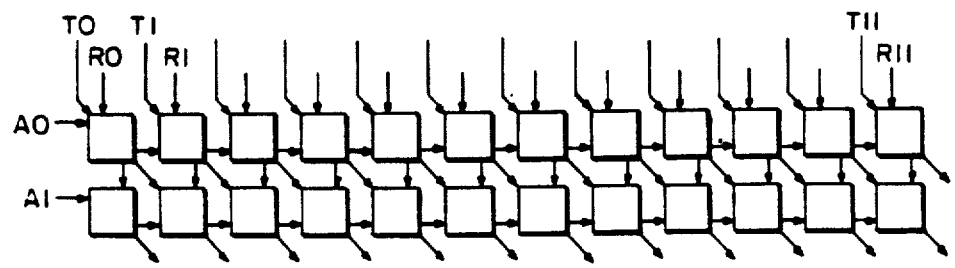
FIG. 5 is a diagram illustrating allocation logic employed in the routing switch element of FIG. 4.

As indicated previously, the function of the allocation logic included in each sub unit 101-116 of the crossbar matrix is to assign the available address equivalent output channels to requesting input channels on a random basis so that no processor is favored in access to the memory. FIG. 5 is a general illustration of a suitable allocation logic which is constructed by replicating a relatively simple combinatorial logic sub-element. In FIG. 5, the input signals A0 and A1 represent the availability of the respective pair of address equivalent output channels, e.g. the output channels corresponding to the output leads 51 and 52 in the case of sub-unit 101. These signals will normally be asserted in the absence of a detected malfunction of the respective output channel. The input signals R0-R11 are based upon the decoding of the initial address bits in an incoming message and the respective signal is asserted if the decoded address corresponds to the memory region with which the output channels communicate. The random number generator 120 provides a random number which is decoded in a one-of-twelve fashion and these twelve signals are employed as inputs to the logic illustrated in FIG. 5 and are designated by reference characters T0-T11. The signals A0-A1 and R0-R11 may be considered setup signals and the signals T0-T11 may be considered activation signals with reference to the particular asynchronous implementation described hereinafter.

Once the incoming addresses are decoded and the messages seeking the respective memory region have asserted corresponding ones of the signals R0-R12, the random number generator asserts one and only one of the signals T0-12. In essence, the logic circuitry of FIG. 5 comprises a twelve-by-two allocator constructed using twenty four one-by-one sub allocators which comprise simple combinatorial logic building blocks.

Figure 6:
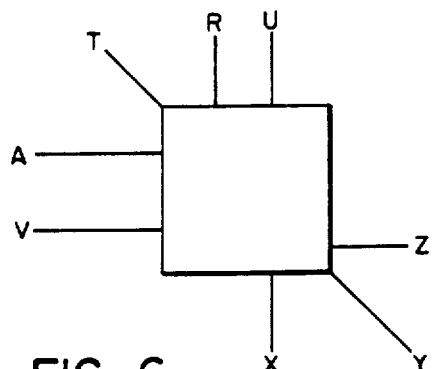
FIG. 6 is a diagram illustrating an allocation of logic sub-element which is repeatedly employed in the allocation logic of FIG. 5.

The function of the individual one-by-one allocator elements is relatively simple. It may be described with reference to FIG. 6 which is a general illustration of an individual one of the one by one allocators. The allocator circuit is of a general type known in the art as domino logic. In logic of this type, setup signals are applied to determine the path of action through the circuitry in response to an activation signal. In the allocator circuitry of FIGS. 5 and 6, the propagated activation signal is referred to as a token. The token is started at a location determined by the random number generator and it propagates through the array along a path determined by which output channels are available and which input leads are seeking them. With reference to FIG. 6, the setup signals are labeled R and A in correspondence with FIG. 5. The signal T represents an activation signal or token. In the top row the token originates with the random number generator. In the interior of the array to token can come from an element on the upper left diagonal (again designated signal T) or from the element above (designated signal U) or from the element to the left (designated signal V). There are three outputs labeled X, Y and Z. If both A and R are asserted when a token enters the element, Y and only Y will be asserted. If A is unasserted when T is asserted, then X and only X will be asserted. If R is unasserted when T is asserted, Z and only Z will be asserted.

With reference to the overall diagram of FIG. 5, an output channel, e.g. 51 or 52 in FIG. 4, will be allocated whenever a Y output is asserted. In other words, the primary channel will be allocated when a Y signal is asserted out of one of the one-by-one allocators in the top row and secondary channel will be allocated when the Y signal is asserted out of one of the one-by-one allocators in the lower row. The Y signals control the respective cross point switching circuits described in greater detail hereinafter. In each case, the input channel (31-38) being allocated an output channel will correspond to the position of the sub allocator which asserted the respective Y signal.

As will be understood by those skilled in the art, the logical functions described with reference to FIGS. 5 and 6 could be implemented in a wide variety of different integrated circuit types fabricated according to various process and it will be understood that the choice of particular process is not a part of the present invention. By way of example, however, FIG. 7 illustrates a presently preferred manner of fabricating a sub allocator element of the type illustrated in FIG. 6 in dynamic CMOS (complementary metal oxide semiconductor).

Figure 7:
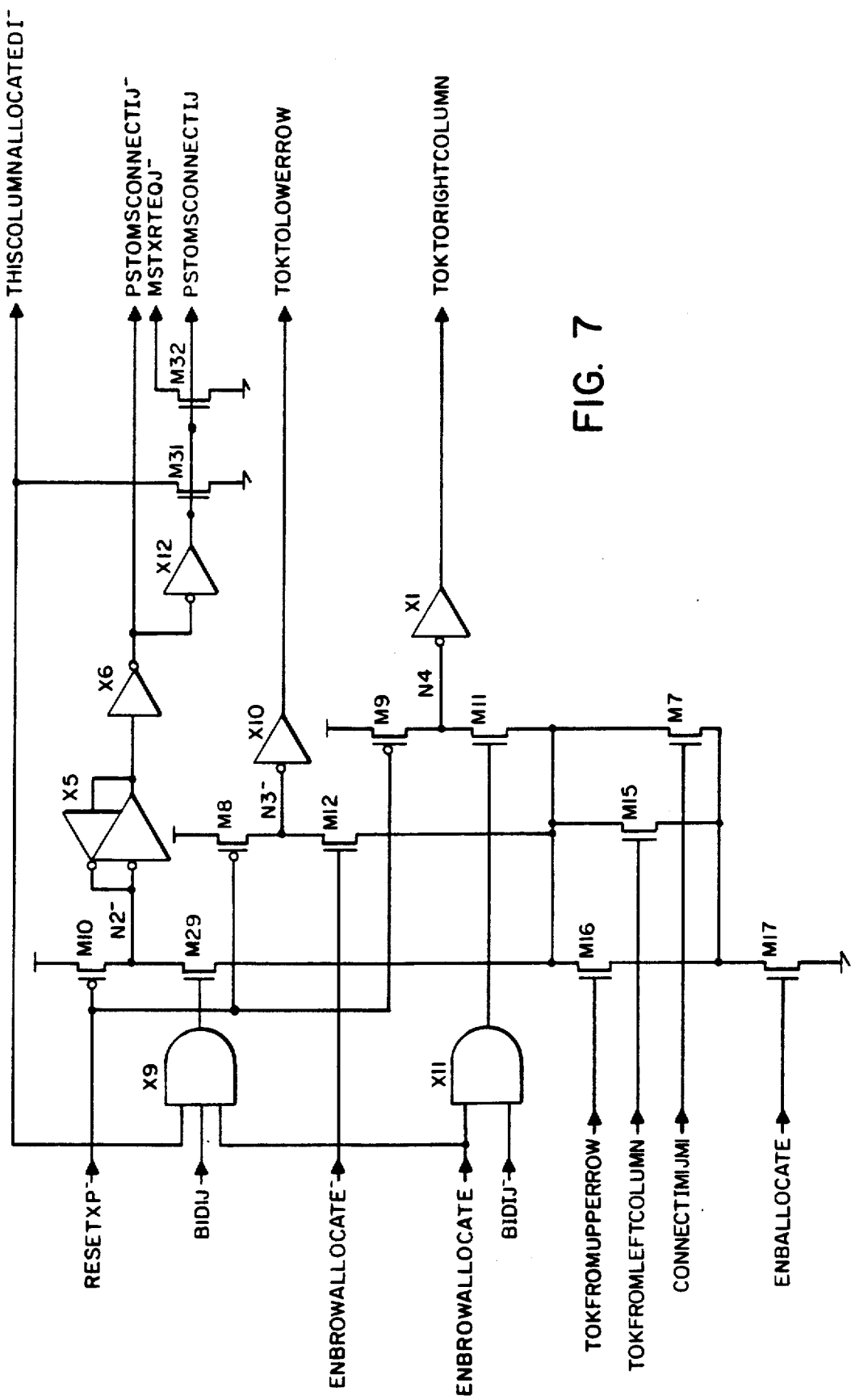
FIG. 7 is a schematic circuit diagram of a particular integrated circuit implementation of the allocation logic sub-element of FIG. 6.

FIG. 7 and the various other detailed circuit diagrams described hereinafter were developed using the Circuit-Tool schematic capture software available from Aquila Associates, running on Sun 3/50 workstations. As is conventional, many of the input and output signals are generated in complemented (inverted) form as well as non-inverted form, thereby to facilitate the particular circuit implementation. The inverted signal is designated by a bar following the mnemonic signal designation. To facilitate an understanding of the meanings of the various mnemonics, expanded definitions are given in Table I. Nodes referred to in the description are assumed to be capacitive so as to retain state in the absence of external influence, even though the capacitance is not explicitly shown in the drawings.

The setup signals are EnbRowAllocate with its compliment, Bidij with its compliment, and ThisColumnAllocated__. In relating FIG. 7 to FIG. 5, the signal EnbRowAllocate is a setup signal corresponding to the A signal in the leftmost column and the signal Bidij is a setup signal corresponding with the R signal in the topmost row. If EnbRowAllocate is clear, the allocation element will not allocate the memory side channel to any processor side channel. The Bidij signal indicates that processor side channel i is bidding for memory side channel j. ThisColumnAllocated indicates that one allocation element in the column has already decided to assign the processor side channel to one of the memory side channel. ResetXp, a sequencer generated timing signal, is asserted just prior to the allocation process to precharge nodes N2__, N3__, N4__, and MsTxReqj__. This causes the output signals PsToMsConnectij, TokToLowerRow, TokToRightColumn, MsTxReqj, and ThisColumnAllocated to be cleared. In relating FIG. 7 to FIG. 6, the signal TokToLowerRow corresponds to the X signal, the TokToRightColumn corresponds to the Z signal, and ThisColumnAllocated signal corresponds to the Y signal. EnbAllocate is a positive timing pulse whose transition to asserted starts the allocation process. Signals TokFromUpperRow, TokFromLeftColumn, and ConnectImlJml are activation signals sourced from allocation elements above, to the left of, and diagonally to the upper left of the allocation element respectively. These signals correspond to the signals U and V and T of FIG. 6. In the top row, the ConnectImJml signals are forced clear and in the left column the TokFromLeftColumn signals are forced clear.

Dependent upon a random number generator, one and only one of the TokFromUpperRow signals is asserted in the top row of the array prior to the assertion of EnbAllocate. If the PsToMsConnectij signal is generated, it overpowers a back-to-back inverter pair X5 which serves to latch the PsToMsConnectij state for the entire period of transferring the request and reply messages.

Figure 8:
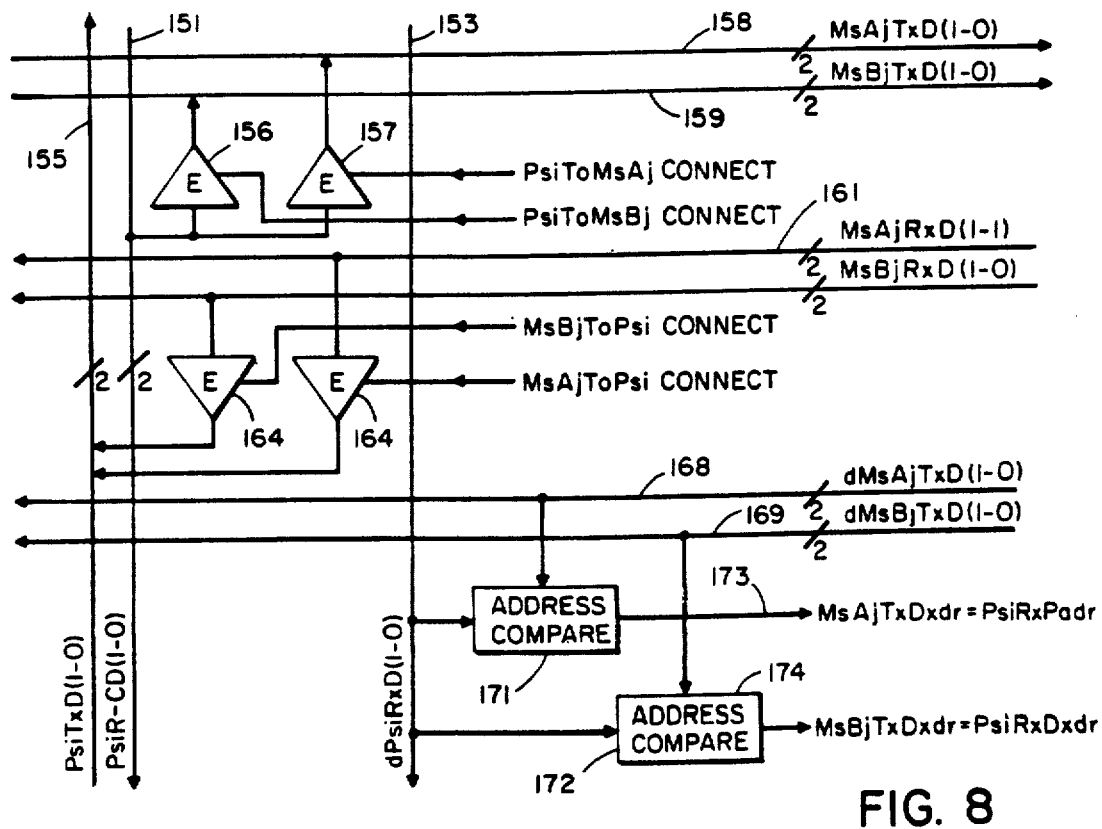
FIG. 8 is a logic diagram of a cross point switching sub-element employed repeatedly in the routing switch element of FIG. 4.

The block diagram of FIG. 8 illustrates the general functionality provided by the pair of cross-point circuits and the decoding circuitry corresponding to a given input channel in each one of the sub-units 101-116. Basically, this is the functionality, other than the shared allocation function described previously, which occurs at each intersection of one of the input or processor side data channels with the pair of output or memory side channels which are address equivalent, i.e. which go to the same memory region. In FIG. 8, the incoming processor side data is received on the leads 151 while the delayed version of that same data, obtained from the flipflop circuitry 124 (FIG. 4) is received on leads 153. The leads for data being returned to the processor side channel are designated by reference character 155. Gated drivers 156 and 157 are provided for selectively applying the incoming data to either the first set of outgoing memory side leads, designated by reference character 158, or the secondary set designated by reference character 159. The primary and secondary memory side leads may, for example, correspond to memory side bidirection leads 51 and 52 in FIG. 4 but, in any case, should be understood to be address equivalent.

Data returned by the memory is provided through data leads designated by reference characters 161 and 162 for the primary and secondary channels, respectively. Either of these channels can be connected to the processor side outgoing data path leads 155 through respective gated drivers 164 and 165. The mirrored and delayed version of the data transmitted toward the memory side through leads 158, e.g. as generated by one of the flipflop circuitries 122, is returned on leads designated by reference character 168 while the delayed data from outgoing lead 159 is returned on leads designated by reference character 169.

A pair of address comparing circuits are provided as indicated by reference characters 171 and 172. Each of these is operative to compare the delayed incoming address data provided over leads 153 with mirrored address data appearing on a respective one of the memory side returning data leads 161 or 162. The comparing circuits assert a respect output signal, provided over leads designated by reference characters 173 and 174, if there is a mismatch occurs in the compared address data streams. As described previously, these signals are used to cause data returned by memory to be applied in response to a blocked processor request message as well as in response to a successful request message, providing both requests were directed to the same memory location.

As indicated previously, the gating of the forward drivers 156 and 157 is controlled in response to the allocation function described previously, i.e. the "connect" signals which control the gated drivers are derived from the respective Y signals generated by the shared allocation circuitry. The return gating controls are applied during the memory reply portion of the frame interval if either the respective forward gating control was generated or if a respective address match was obtained.

Figure 9:
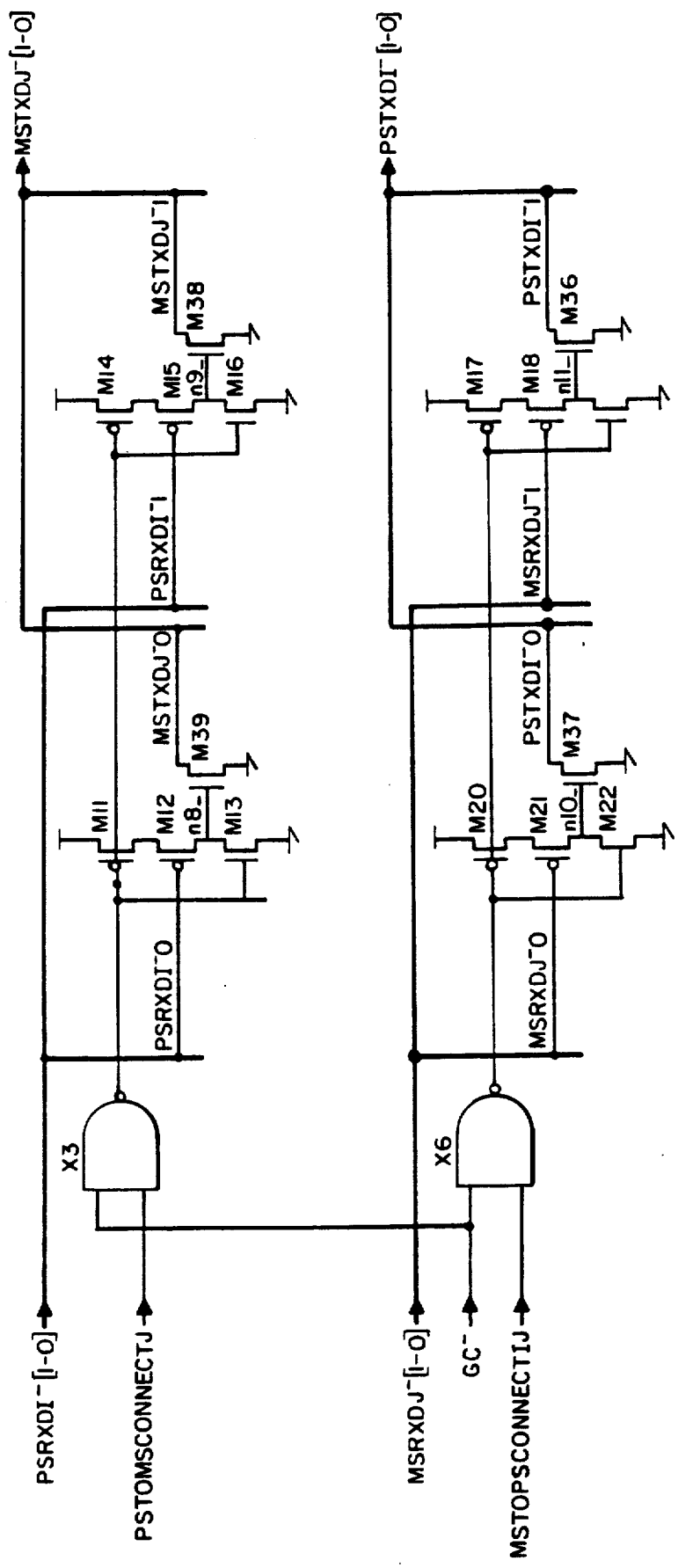
FIG. 9 is a schematic circuit diagram of a particular integrated circuit implementation of signal connection logic employed in the sub-element of FIG. 8.

As noted previously, the particular logic type employed for implementing the various functions described is not part of the invention since the functions could be implemented in a wide variety of ways understood by those skilled in the art. By way of example, however, FIG. 9 illustrates a particular way in which the cross-point connection functions illustrated in FIG. 8 may be implemented in dynamic CMOS.

There are two topologically identical circuits, one for the processor to memory channel path and one for the memory to processor channel path. After the allocation process and request address comparison used for read combining, a crosspoint can be in one of three states: 1) disconnected, i.e. no path between processor and memory channels are established, 2) both directions connected, i.e. a path is established in both the processor to memory direction and the memory to processor direction, and 3) read combining connected, i.e. a path is established in the memory to processor direction only. Note that the last possible combination of a path being established in the processor to memory direction but not in the memory to processor direction is not implemented, i.e. is prohibited.

Data transfer operation across the crosspoint element is essentially as follows.

During the positive duration of the clock gC, nodes N8_, N9_, N10_, and N11_ are precharged low and nodes MsTxDj_[1-0] and PsTxDi_[1-0] are precharged high. Also during the positive duration of the clock gC, the serialized request, sourced from the processor side channel on signal lines PsRxDi_[1-0] and the serialized reply, sourced from the memory side channel on signal lines MsRxDj_[1-0] change state. During the negative duration of the clock gC, node s_N8 N9_N10 and N11 are conditionally pulled high thereby conditionally discharging nodes MsTxDj_0, MsTxDj_1, PsTxDi_0, and PsTxDi_1 respectively.

Figure 10:
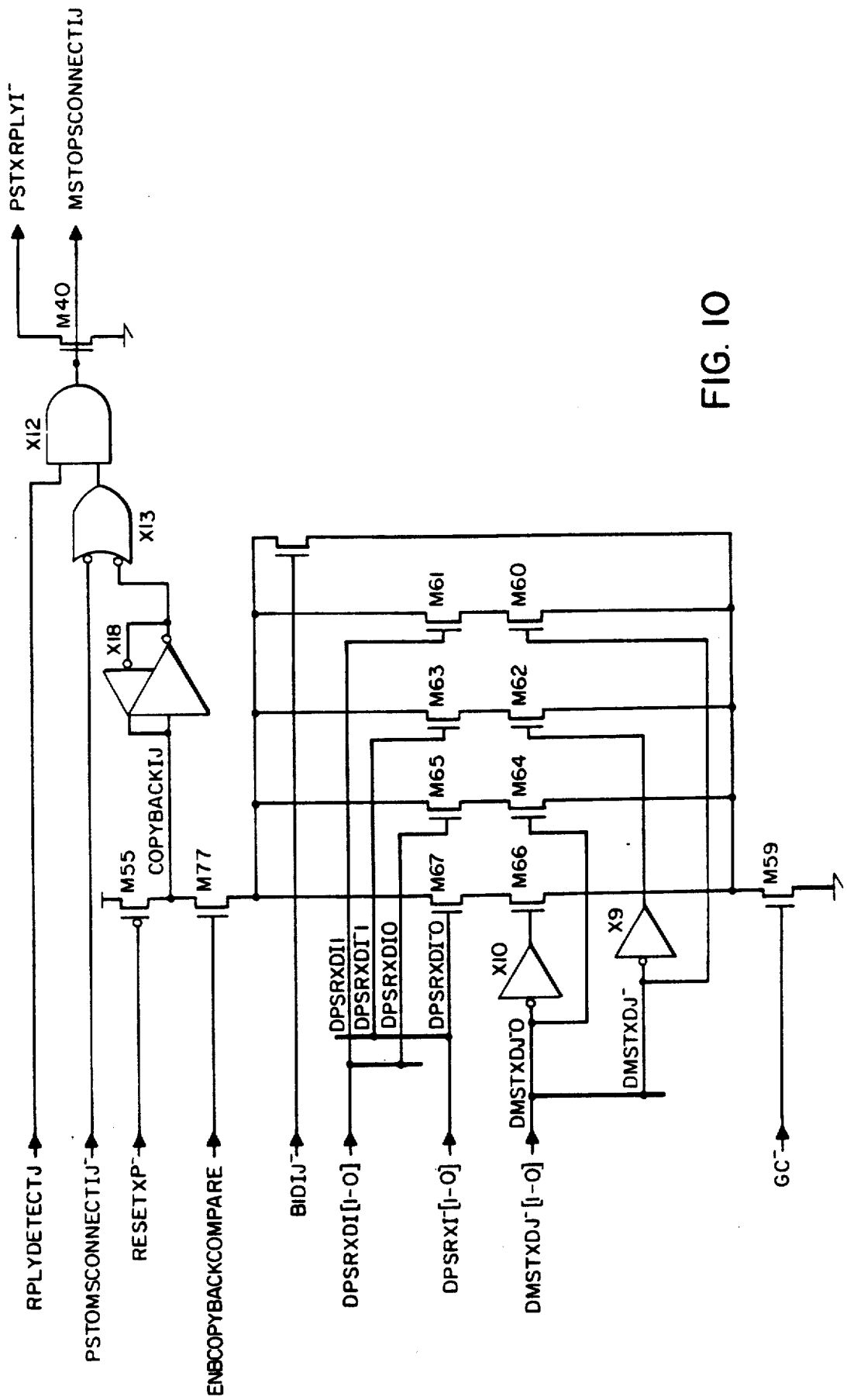
FIG. 10 is a schematic circuit diagram of a particular integrated circuit implementation of address comparison circuitry employed in the sub-element of FIG. 8.

As indicated previously with reference to FIG. 8, logic is provided at each crosspoint to compare the address of the request sourced from the associated processor side channel with the request address being transmitted out the memory side channel. A CMOS implementation of such logic is illustrated in FIG. 10. If the address comparison is successful, a reply coming back from the memory will be propagated to all processor side channels attempting to read from the same location.

The request is propagated through a crosspoint to the memory side channel on signal lines MsTxDj_[1-0]. These signals are resynchronized on the zero to one transition of the clock and then rebroadcast back to all crosspoints in the row on signal lines dMsTxDj_[1-0]. Simultaneously, a delayed replica of the request sourced from the processor side channel is broadcast to all crosspoints in a column on signal lines dPsRxDi_[1-0]. These two pairs of signals, dPsRxDi_[1-0] and dMsTxDj_[1-0] are compared throughout the entire address portion of the request message.

The assertion of ResetXp precharges node CopyBackij high thereby indicating that the request header sourced by the processor side channel is identical to the request header transmitted on the memory side channel. In addition, the assertion of ResetXp also precharges PsTxRplyi_ high indicating that no reply is to be transmitted out from the processor side channel. During the interval in which the address header is being broadcast on the ddPsRxDi_[1-0] signal lines, EnbCopyBackCompare is asserted. When EnbCopyBackCompare ANDed with the compliment of clock is asserted, CopyBackij is pulled low is either dMsTxD[1-0] does not equal ddPsRxD[1-0] (i.e. the address is not identical) or Bidij is not asserted (i.e. the processor side channel is not bidding for the memory side channel) or InhCopyBacki is asserted (i.e. the copyback function is inhibited). CopyBackij drives back-to-back inverters X18 which latch the CopyBackij_ signal for the remaining portion of the frame. CopyBackij is ORed with PsToMsConnectij_ and ANDed with RplyDetectj to form MsToPsConnectij which indicates that a memory side to processor side data path is to be established. RplyDetectj is asserted when a reply is detected into the memory side channel and is not asserted while EnbCopyBackCompare is asserted. When RplyDetectj ANDed with MsToPsConnectij is asserted, PsTxRplyi_ is pulled low to indicate that the reply is to be transmitted from the processor side channel.

Figure 11:
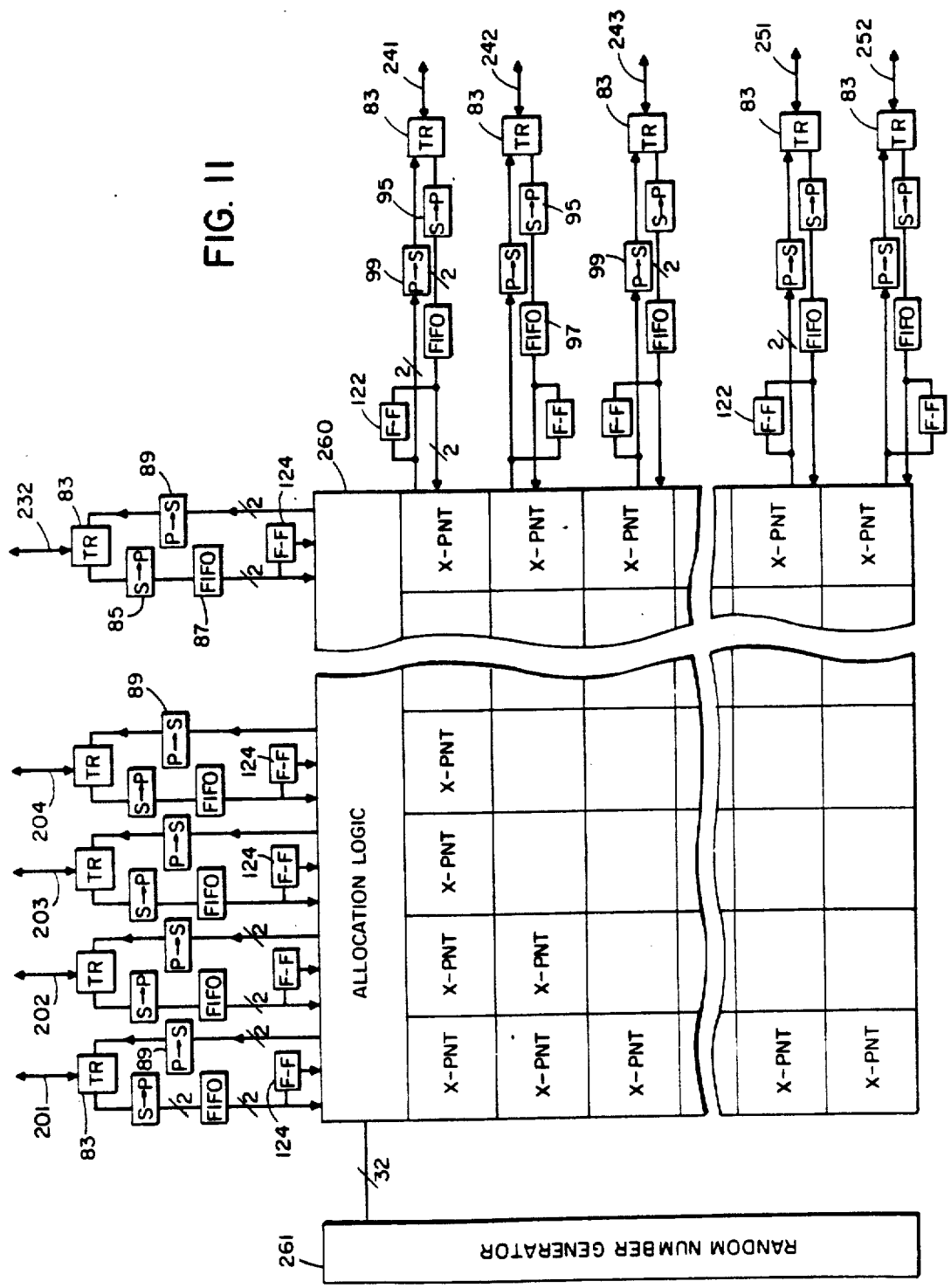
FIG. 11 is a block diagram of a typical concentrator element employed repeatedly in the multiprocessor computer of FIG. 1.
Figure 12:
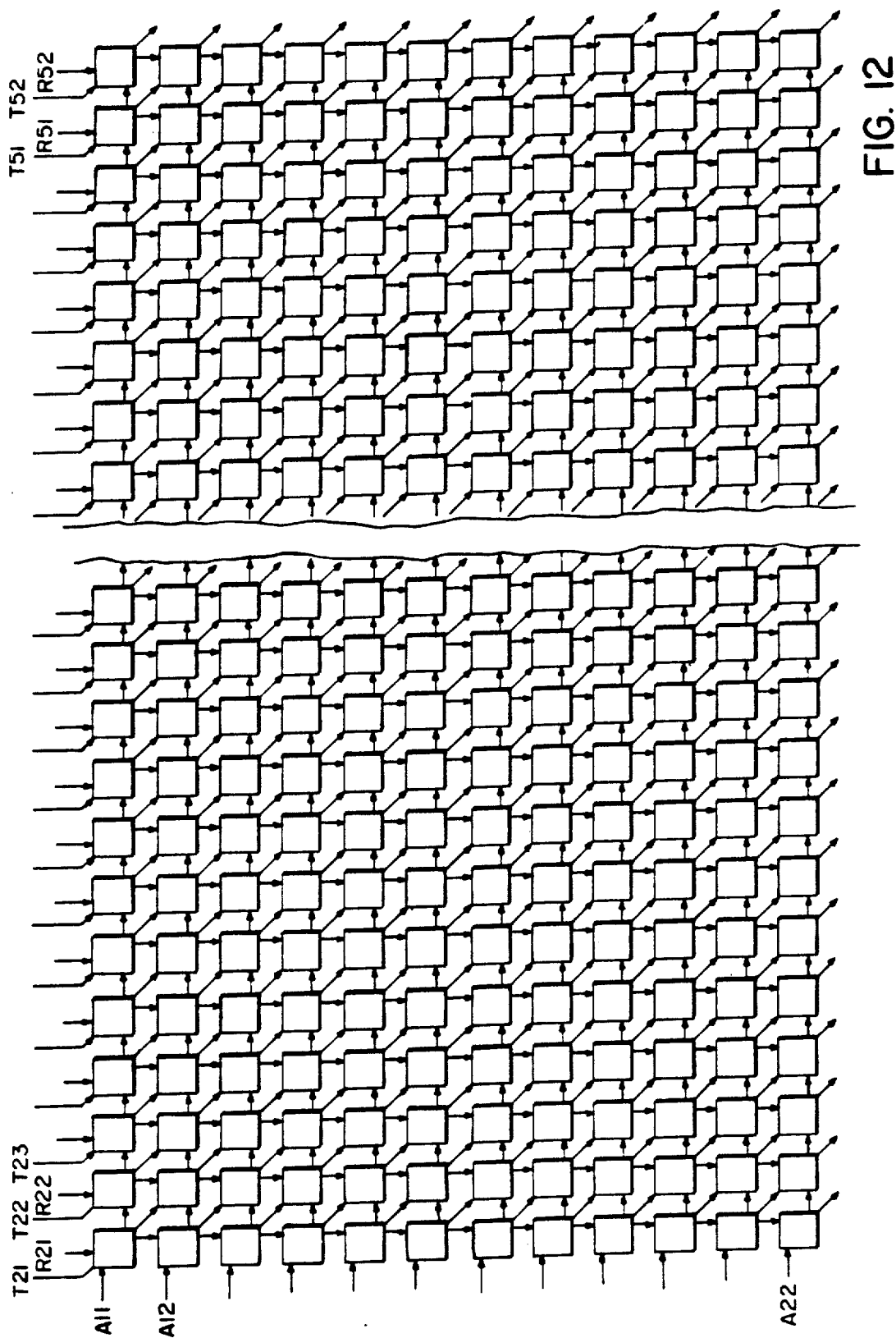
FIG. 12 is a diagram illustrating allocation logic employed in the concentrator element of FIG. 11.

As indicated previously, the general function of each concentrator element is to allocate a limited number of address equivalent output leads to request messages which may appear on any one of a larger number of input leads. While the concentrator elements do not perform any address decoding or routing in the sense of selecting between different regions of memory, many of the logic sub-components of the concentrator elements are essentially the same as corresponding sub-components in the routing switch element, as will be apparent from the following description. FIG. 11 illustrates the functional arrangement of a typical one of the concentrator elements in a manner comparable to that in which FIG. 4 illustrates a typical routing switch element.

In its most typical configuration, each concentrator element comprises thirty-two bidirectional input leads, designated by reference characters 201-232, and twelve bidirectional output leads, designated by reference characters 241-242. As with the routing switch elements, there is associated with each of the bidirectional input leads T/R (transmit/receive) circuitry 83 for coupling to unidirectional internal data paths, serial-to-parallel (85) and parallel-to-serial (89) converters for broadening the internal data paths and FIFO registers 87 for allowing incoming messages to be synchronized. Also, flip-flop circuitry 124 is included for providing a delayed version of data being received. Corresponding circuitry is provided for each of the output leads 240, 252, this circuitry again being essentially identical with that employed for each output lead in the routing switch elements of FIG. 4.

Unlike the arrangement in the routing switch elements, however, the output leads 241-252 are not arranged in pairs but rather all of the output leads are equivalent since all are directed to the same region of memory, as discussed previously. As may be seen from FIG. 11, the concentrator element comprises a quite general cross-bar switching matrix. At each intersection of an input channel with an output channel, there is provided cross-point switching circuitry as indicated in the drawing. This circuitry is essentially the same as that employed at each cross-point in the routing switch element and may be implemented essentially as illustrated in FIGS. 8 and 9. Each cross-point similarly includes the address comparison circuitry as illustrated in FIGS. 8 and 10 since, to effectively provide read combining, memory response messages must be able to be returned through the concentrator elements to blocked requests as well as to allocated requests if the addresses are the same.

The switch matrix is also provided with allocation logic as indicated by reference character 260 in FIG. 10. As suggested previously, the function of the allocation logic 260 is to operate the various cross-point switching circuits so as to allocate available output leads to requesting input messages on an essentially random basis so that no processor is preferred in accessing memory.

The allocation logic itself is illustrated in FIG. 11. As may be seen, the allocation logic comprises a regular 32×12 array of one-by-one allocator sub-elements of the type described previously with reference to FIGS. 6 and 7. Similarly, each concentrator element incorporates a random number generator, designated by reference character 261, which provides a random number which is decoded in a one-of-thirty two fashion. The output signals from the random number generator are identified by reference characters T21-T52 in the FIG. 11 illustration of the allocation logic. With reference to the input leads, the signals which represent the presence of a requesting message are designated by reference characters R21-R52 while the availability of the various output leads are indicated by signals identified by reference characters A11-A22.

While the array of sub-elements within the allocation logic of each concentrator element is larger than the arrays used in the routing switch elements, the principal of operation is essentially the same. It can thus be seen that the output channels will be allocated to requests presented on the various input leads 201-232 on an essentially random basis. As indicated previously, the number of requesting messages will typically be much less than the number of input leads so that the likelihood of blocking is low. Further, if a blocked message is a memory read type request, directed to the same memory address as an allocated request, the memory response will be returned to the blocked request as well as to the allocated request, i.e. effecting read combining just as happens in the routing switch elements as described previously.

From the foregoing description, it can be seen that the architecture of the present invention provides a highly effective and efficient means for allowing multiple processors to communicate with a shared memory, keeping the number of leads and connections between components within manageable bounds even if the number of processors is very large. By the arrangement of the present invention, contention between processors in seeking access to memory is reduced to an acceptable level. Further, a highly efficient mechanism for combining memory read operations is provided so that the effects of contention are further reduced when a number of processors are trying to read the same memory location.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

TABLE 1

| | |
|---|---|
| RESETXP | Reset crosspoint |
| BIDIJ | The ith input is seeking the jth output |
| ENBROWALLOCATE | The output channel is available so the row may be allocated. |
| TOKFROMUPPERROW | The token signal if arriving from the row above |
| TOKFROMLEFTCOLUMN | The token signal if arriving from the column to the left |
| CONNECTIMIJMI | The token signal if arriving from the diagonal upper left adjacent element |
| ENBALLOCATE | A sequence timing signal which enables allocation |
| THISCOLUMNALLOCATED | Signals that one allocation element has assigned the input channel, a wired OR signal linking the elements in a column |
| PSTOMSCONNECTIJ | Processor side to memory side connect - i.e. the diagonal token output |
| MSTXRTEQJ | A wired OR signal linking the elements in a row and indicating that the output channel is assigned and should operate |
| TOKTOLOWERROW | The token passing to the row below |
| TOKTORIGHTCOLUMN | The token passing to the column to the right |
| PSRXDI | Date received from the processor side |
| MSRXDJ | Data received from the memory side |
| MSTOPSCONNECTIJ | A control signal indicating that the memory side data is to be coupled to the processor side |
| GC | Clock |

TABLE 1-continued

| | |
|---|---|
| MSTXDJ | Data transmitted out the memory side |
| PSTXDI | Data transmitted out the processor side |
| RPLYDETECTJ | A reply from the memory side has been detected |
| ENBCOPYBACKCOMPARE | A sequencing signal which enables the comparison function during the address portion of a message |
| DPSRXDI [1-0] | Delayed processor side received data |
| DMSTXDJ [1-0] | Delay memory side transmitted data |
| MSTOPSCONNECTIJ | Memory side to processor side connect control signal |
| PSTXRPLYI | A wired OR signal indicating replys are to be transmitted |

What is claimed is:

1. Parallel processing computational apparatus comprising:
a memory addressable at a multiplicity of address locations;
clock means providing indications of a high speed basic clock period and a synchronizing start time;
a multiplicity of wide word processors, said processors being synchronized to the start time indication provided by said clock means to issue memory requests only at a predetermined time within a frame interval encompassing a predetermined substantial number of clock periods, the predetermined time being the same for all the processors in said multiplicity, said requests being issued as bit serial messages in which the initial bits in the message define the memory address location to which the respective request is directed and are ordered in correspondence with successive groupings of memory address locations;
a network for selectively connecting each processor to each memory address location, said network including a plurality of similar routing switch elements arranged in at least three stages each having a plurality of routing switch elements, each routing element having a plurality of output leads connectable to respective different address groups of said memory address locations and a plurality of input leads any one of which may receive a message seeking direction to any one of the respective address groups, the routing elements in each stage being operative to direct incoming messages to routing elements in a next stage, which routing elements are selected in response to corresponding address bits in the messages; and
interposed between at least two stages of said routing elements, a stage of concentrator elements, each concentrator element having a plurality of input leads connected to address equivalent output leads of a preceding stage of routing elements and a number of output leads connected to address equivalent input leads of a following stage of routing elements, the number of concentrator element output leads being substantially smaller than the number of concentrator element input leads, each of said concentrator elements having means for transferring a message arriving on any input lead to an output lead based on a random selection of simultaneous incoming messages up to the number of output leads.

2. Apparatus as set forth in claim 1 wherein each routing switch element has at least two output leads for each memory address group which the routing element can address whereby said network provides redundant paths through which each processor can address each memory location.

3. Apparatus as set forth in claim 2 wherein each routing switch element includes means for allocating each output lead to simultaneous incoming messages based upon a random selection of simultaneous incoming messages, unallocated messages being blocked.

4. Apparatus as set forth in claim 3 wherein said routing elements and said concentrator elements are implemented as matrix switches and, associated with each matrix intersection is comparator means for determining whether an unallocated message blocked at that intersection is addressed to the same memory location as an allocated message simultaneously passing through the respective routing or concentrator element.

5. Apparatus as set forth in claim 1 wherein said processors issue memory requests simultaneously within a first part of a frame interval and addressed memory locations issue responses simultaneously within a later part of the same frame interval.

6. Apparatus as set forth in claim 1 wherein processors issue memory requests at a predetermined time within a first part of a frame interval and the addressed memory issues responses at a later predetermined time within the same frame interval and wherein
said routing switch elements and said concentrator elements are implemented as matrix switches providing bidirectional data path means for connecting an input lead to an output lead and wherein a connection established for a request is maintained for the remainder of a frame interval so that memory responses can be communicated back to a requesting processor without further routing decisions.

7. Apparatus as set forth in claim 3 wherein processors issue memory requests at a predetermined time within a first part of a frame interval and the addressed memory issues responses at a later predetermined time within the same frame interval and wherein
said routing switch elements and said concentrator elements are implemented as matrix switches providing bidirectional data path means for connecting and input lead to an output lead and wherein a connection allocated for a request is maintained for the remainder of a frame interval so that memory responses can be communicated back to a requesting processor without further routing decisions and include, associated with each matrix intersection, comparator means for determining whether a request message blocked at that intersection is addressed to the same location as an allocated request message simultaneously passing through the element and, if the addresses are determined to be the same, communicating the memory response to the allocated request message also back to the processor issuing the blocked request message.

8. Apparatus as set forth in claim 1 wherein the average ratio of the number of routing switch input leads to the number of routing switch output leads is approximately equal to the average ratio of the number of concentrator output leads to the number of concentrator input leads.

9. Parallel processing computational apparatus comprising:

a memory addressable at a multiplicity of address locations;

clock means providing indications of a high speed basic clock period and a synchronizing start time;

a multiplicity of wide word processors, said processors being synchronized to the start time indication provided by said clock means to issue memory requests only at a predetermined time within a frame interval encompassing a predetermined substantial number of clock periods, the predetermined time being the same for all the processors in said multiplicity, said requests being issued as bit serial messages in which the initial bits in the message define the memory address location to which the request is directed and the address bits are presented least significant bits first;

a network for selectively connecting each processor to each memory address location, said network including a plurality of similar routing switch elements arranged in at least three stages each having a plurality of routing switch elements, each routing element having at least two output leads connectable to each of a plurality of different address groups of said memory address locations and a plurality of input leads any one of which may receive a message seeking direction to any one of the respective address groups, the routing elements in each stage being operative to direct incoming messages to routing elements in a next stage which routing elements are selected in response to initial address bits in the messages, with output leads being assigned on a random basis to simultaneous incoming messages seeking the same address group, the address bits which controlled selection in each stage being dropped from the message passed on to the next stage; and interposed between successive stages of said routing elements, respective stages of concentrator elements, each concentrator element having a plurality of input leads connected to address equivalent output leads of a preceding stage of routing elements and a number of output leads connected to address equivalent input leads of a following stage of routing elements, the number of concentrator element output leads being substantially smaller than the number of concentrator element input leads, each of said concentrator elements having means for transferring a message arriving on any input lead to an output lead based on a random selection of simultaneous incoming messages up to the number of output leads.

10. Parallel processing computational apparatus comprising:

a memory addressable at a multiplicity of address locations;

clock means providing indications of a high speed basic clock period and a synchronizing start time;

a multiplicity of wide word processors, said processors being synchronized to the start time indication provided by said clock means to issue memory requests only at predetermined time within a first part of a frame interval encompassing a predetermined substantial number of clock periods, the predetermined time being the same for all the processors in said multiplicity, said requests being issued as bit serial messages in which the initial bits in the message define memory address location to which the respective request is directed, said memory being operative to issue responses at a later predetermined time within the same frame interval;

a network for selectively connecting each processor to each memory address location, said network including a plurality of similar routing switch elements arranged in a plurality of stages each having a plurality of routing switch elements, each routing element having a plurality of output leads connectable to respective different address groups of said memory address locations and a plurality of input leads any one of which may receive a message seeking direction to any one of the respective address groups, the routing elements in each stage being operative to direct incoming messages to routing elements in a next stage, which routing elements are selected in response to corresponding address bits in the messages, said routing switch elements being implemented as matrix switches providing bidirectional data path means for connecting an input lead to an output lead wherein a connection allocated for a request is maintained for the remainder of a frame interval so that memory responses can be communicated back to a requesting processor without further routing decisions, said routing switch elements including, associated with each matrix intersection, comparator means for determining whether a request message blocked at that intersection is addressed to the same memory address location as a request message simultaneously passing through the element and, if the addresses are determined to be the same, communicating the memory response to the passing request also back to the processor issuing the blocked message.

11. Apparatus as set forth in claim 10 wherein the address data is presented least significant bits first and the respective address bits utilized by a routing switch element are dropped from the message passed on to the next stage.

12. Apparatus as set forth in claim 10 further comprising, interposed between at least two stages of said routing elements, a stage of concentrator elements, each concentrator element having a plurality of input leads connected to address equivalent output leads of a preceding stage of routing switch elements and a number of output leads connected to address equivalent input leads of the following stage of routing switch elements, the number of concentrator element output leads being substantially smaller than the number of concentrator element input leads, said concentrator elements having means for transferring a message arriving on any input lead to an output lead based on a random selection of simultaneous incoming messages up to the number of output leads.

13. Apparatus as set forth in claim 12 wherein said concentrator elements are implemented as matrix switches providing bidirectional data path means for connecting an input lead to an output lead and wherein a connection established for a request is maintained for the remainder of a frame interval so that memory responses can be communicated back to a requesting processor without further routing decisions and said concentrator elements include, associated with each matrix intersection, comparator means for determining whether a request message blocked at that intersection is addressed to the same location as a message simultaneously passing through the element and, if the addresses are determined to be the same, communicating the memory response to the passing request also back to the processor issuing the blocked request message.

14. Parallel processing computational apparatus comprising:

a memory addressable at a multiplicity of address locations;

clock means providing indications of a high speed basic clock period and a synchronizing start time;

a multiplicity of wide word processors, said processors being synchronized to the start time indication provided by said clock means to issue memory requests only at a predetermined time within a first part of a frame interval encompassing a predetermined substantial number of clock periods, the predetermined time being the same for all the processors in said multiplicity, said requests being issued as bit serial messages in which the initial bits in the message define the address of the memory location to which the request is directed with the address data presented least significant bit first, said memory being operative to issue responses at a later predetermined time within the same frame interval;

a network for selectively connecting each processor to each memory address location, said network including a plurality of similar routing switch elements arranged in at least three stages each having a plurality of routing switch elements, each routing element having at least two output leads connectable to each of a plurality of different address groups of said memory address locations and a plurality of input leads any one of which may receive a message seeking direction to any one of the respective address groups, the routing elements in each stage being operative to direct incoming messages to routing elements in a next stage, which routing elements are selected in response to corresponding address bits in the messages, with output leads being allocated on a random basis to simultaneous incoming messages seeking the same address group, the respective address bits being dropped from the message passed on to the next stage, said routing switch elements being implemented as matrix switches providing bidirectional data path means for connecting an input lead to an output lead wherein a connection established for a request is maintained for the remainder of a frame interval so that memory responses can be communicated back to a requesting processor without further routing decisions, said routing switch elements including, associated with each matrix intersection, comparator means for determining whether a message blocked at that intersection is addressed to the same location as a message simultaneously passing through the element and, if the addresses are determined to be the same, communicating the memory response to the passing request also back to the processor issuing the blocked message; and interposed between successive stages of said routing elements, respective stages of concentrator elements, each concentrator element having a plurality of input leads connected to address equivalent output leads of a preceding stage of routing elements and a number of output leads connected to address equvalent input leads of a following stage of routing elements, the number of concentrator element output leads being substantially smaller than the number of concentrator element input leads, each of said concentrator elements having means for transferring a message arriving on any input lead to an output lead based on a random selection of simultaneous incoming messages up to the number of output leads, said concentrator elements being implemented as matrix switches providing bidirectional data path means for connecting an input lead to an output lead and wherein a connection established for a request is maintained for the remainder of a frame interval so that memory responses can be communicated back to a requesting processor and said concentrator elements include, associated with each matrix intersection, comparator means for determining whether a message blocked at that intersection is addressed to the same location as a message simultaneously passing through the element and, if the addresses are determined to be the same, communicating the memory response to the passing request also back to the processor issuing the blocked message.

* * * * *